No. 716,305. Patented Dec. 16, 1902.
C. P. STEINMETZ.
SYSTEM OF ELECTRICAL DISTRIBUTION.
(Application filed May 19, 1902.)
(No Model.)

Witnesses.
J. Ellis Glenn.
Helen Orford.

Inventor.
Charles P. Steinmetz.
by Albert G. Davis
Atty.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

SPECIFICATION forming part of Letters Patent No. 716,305, dated December 16, 1902.

Application filed May 19, 1902. Serial No. 107,912. (No model.)

*To all whom it may concern:*

Be it known that I, CHARLES P. STEINMETZ, a citizen of the United States, residing at Schenectady, county of Schenectady, State of New York, have invented certain new and useful Improvements in Systems of Electrical Distribution, (Case No. 2,356,) of which the following is a specification.

My present invention relates to a means for producing and utilizing multiphase alternating currents of constant value, and comprises certain features of novelty particularly pointed out in the appended claims and set forth in detail in connection with certain embodiments of the invention, which are described in the following specification, and illustrated in the accompanying drawings, in which—

Figure 2:
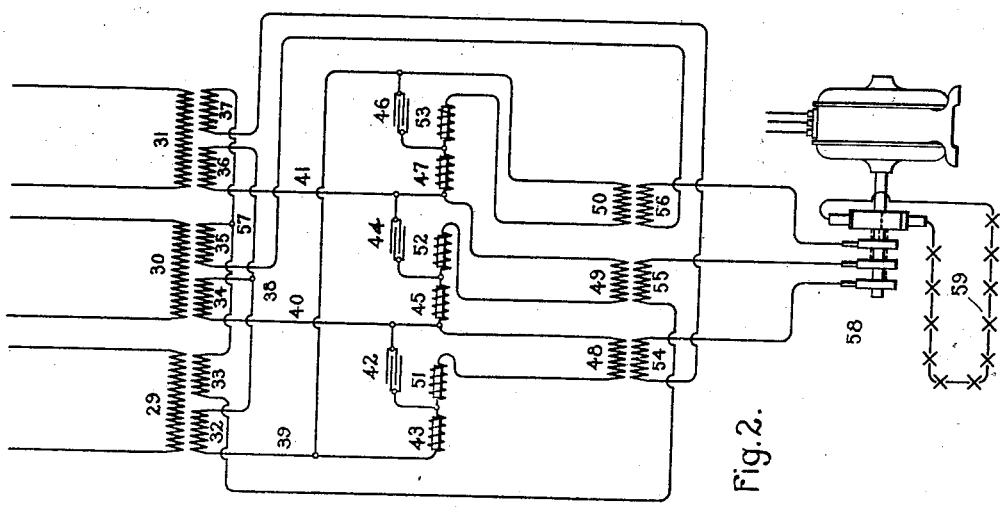
Figure 1:
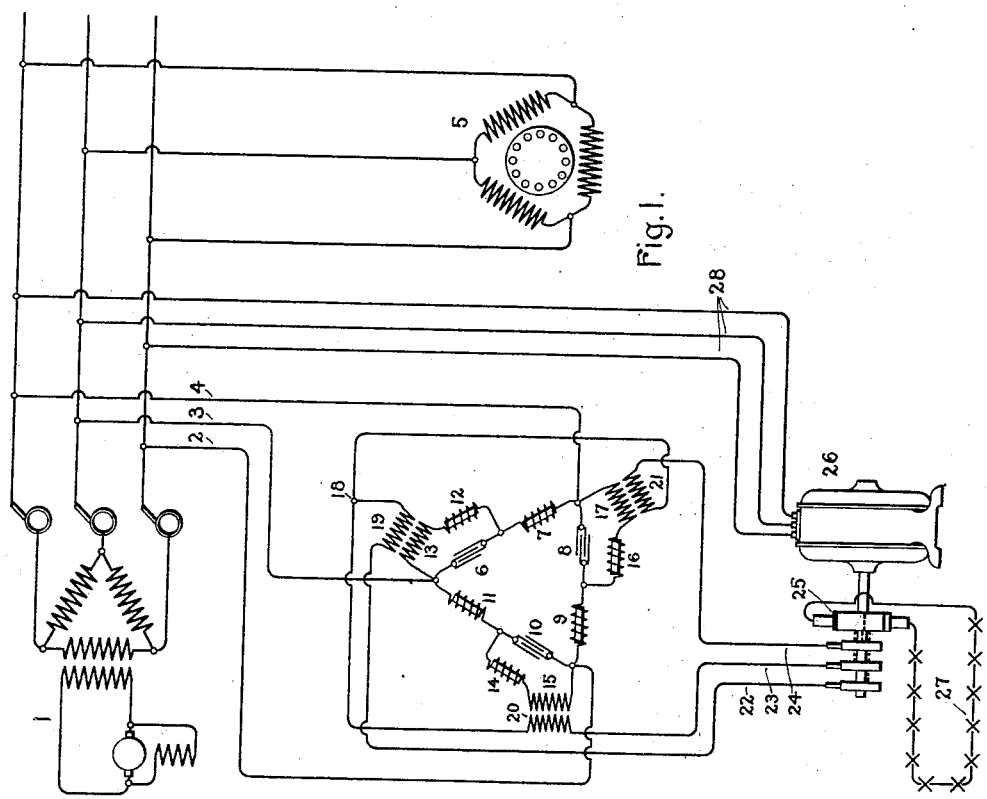

Figure 1 represents one embodiment of my invention, and Fig. 2 a modification.

The multiphase alternating currents of constant value are derived from sources of constant-potential alternating current by the instrumentality of certain combinations of reactances of opposite sign—such, for example, as condensers and inductance-coils. In Fig. 1 the source of constant-potential multiphase current is the three-phase alternating-current generator represented diagrammatically at 1. This generator may be of any ordinary type and needs no special description. Current is supplied from this generator through leads 2, 3, and 4 to an arrangement for transforming the constant-potential current into current of constant value. In addition to supplying this apparatus the generator may of course supply current to any other translating devices of suitable character. As typical of one of the many translating devices which may be thus supplied I have represented an induction-motor 5 receiving current from mains connected to the terminals of the generator 1.

Passing now to a description of the device for changing constant-potential current to current of constant value, it will be noticed that the leads 2 3 4 are connected, respectively, to the three angles of a triangular arrangement of condensers and inductance-coils. Each side of the triangle will be seen to consist of a condenser and an inductance-coil, these condensers and inductance-coils being arranged alternately in regular progression around the sides of the triangle. It is of course to be understood that in practice the condensers and inductance-coils would not ordinarily as pieces of apparatus be located with respect to each other in the geometrical manner indicated; but in explaining the connections between these devices it is convenient to represent them as indicated.

The condenser 6 and the inductance-coil 7, constituting one side of the triangle, are in series with each other across the constant-potential leads 3 4. In a similar manner the condenser 8 and inductance-coil 9 are in series across the constant-potential leads 2 4, while the condenser 10 and inductance-coil 11 are similarly in series across the remaining pair of leads 2 3 of the three-phase supply system. Each of these pairs of reactances of opposite sign—as, for example, the condenser 6 and the inductance-coil 7—has one terminal of a reactive circuit connected thereto, the other terminal of the circuit being connected to one of the supply-leads 2 3 4. This amounts to shunting the reactive circuit around either the condenser or the inductance of each pair. For purposes of symmetry the reactive circuit in each case is shunted about the condenser. As indicated in the drawings, each reactive circuit will be seen to consist of an inductance-coil and the primary of a transformer. Thus about the condenser 6 is shunted a circuit containing the inductance-coil 12 and the primary 13, about the condenser 10 the circuit containing the inductance-coil 14 and the primary 15, while about the condenser 8 is shunted the remaining circuit containing the inductance-coil 16 and the primary 17.

The effect of the inductance in circuit with each primary is to produce a tendency toward constancy of current in the primary, and consequently in the secondary supplied thereby. If any one of these circuits were supplied by a constant-potential current, the inductance, since it forms a large part of the impedance of the circuit, would prevent the current from varying in the same proportion as the load. In some instances the resulting variation of current might be sufficiently close to a condition of constancy to be satisfactory in that respect; but the circuit would, on the other hand, be open to the objection that an excessive lagging current would at all times flow therein. To overcome the effect of this lagging current upon the source of supply, the circuit might be shunted by a condenser which by taking leading current would compensate for the lagging current in the circuit. If this condenser were adjusted so as to compensate, say, at no load for the lagging current in the consumption-circuit, it would overcompensate with increasing load, thereby causing the current in the supply-circuit to become leading, the current in the consumption-circuit at the same time decreasing, although slowly, with the load. By placing in series with the supply-circuit an additional inductance the leading current produced in the supply-circuit as the load is increased in the consumption-circuit is compensated for by the increased lagging current due to the inductance in the supply-circuit, while at the same time the reaction of this leading current upon the reactive supply-circuit causes the voltage at the terminals of the condenser, and consequently at the terminals of the consumption-circuit, to rise with the load. If the two inductances and the condenser be made of equal value, the current in the consumption-circuit becomes constant regardless of the load and the power factor of the supply system unity. This arrangement possesses the valuable advantage that it is not subject to the effects of harmonics in the current-waves which in certain arrangements heretofore proposed for transforming from constant potential to constant current are apt to be magnified through the action of the condenser to such an extent as to seriously impair the constant-current regulation. It is not enough that an induction-coil or other device which has the effect of suppressing harmonics should be interposed between the condenser and the source of supply, but it is also necessary that such a device should be interposed between the condenser and the consumption-circuit, for it will be evident that the character of the devices in the consumption-circuit may be such as to distort the current-wave to an even greater extent than might be due to an impressed-electromotive-force wave differing from the sine form. The condenser being in the arrangement heretofore described screened from the effects of the harmonics has no chance to magnify them, by reason of which fact the regulation of the whole system becomes insensitive to wave form, which in practice is a most important advantage.

Each consumption-circuit which I have indicated in Fig. 1 might, if desired, be used to supply energy entirely independent of the other; but in the instance shown they are interconnected so as to form a constant-current three-phase circuit. This interconnection is made by joining the secondaries corresponding to each primary 13, 15, and 17 in the usual three-phase star connection, the common point of which in the present instance is at 18. This point, of course, is connected to one terminal of each of the secondaries 19, 20, and 21. The remaining three terminals of the secondaries are connected to leads 22, 23, and 24, which pass to a rectifying-commutator 25, driven by a synchronous motor 26. This rectifying-commutator supplies current through a consumption-circuit consisting of a series of arc-lamps 27. The synchronous motor 26 may be of the synchronous-induction type or it may be of the more usual form, which instead of a short-circuited member is provided with a field excited by direct current. I have represented this synchronous motor as supplied through leads 28 with current derived from the main source 1.

It is evident that instead of rectifying the currents in the three-phase constant-current circuit and then supplying the rectified current to translating devices the currents might be utilized without rectification.

The arrangement shown in Fig. 2 differs from that shown in Fig. 1 in that in each constant-current circuit is inserted a source of constant electromotive force. This has the effect of increasing the capacity of the circuit without impairing its regulation, and this in many cases is an important advantage. Three-phase current is supplied to three transformers, the primaries of which are indicated, respectively, at 29, 30, and 31. Each primary is provided with two secondaries, and these secondaries are indicated at 32 to 37, inclusive. Three secondaries, one from each of said transformers, are connected in three-phase relation to each other either in delta or in the usual star connection, and in this particular case in star relation to each other and supply constant-potential current to the constant-current-transforming apparatus consisting of condensers and inductances arranged in the same way as in Fig. 1. The three secondaries thus utilized are the secondaries designated as 32, 34, and 36, one terminal of each of which secondaries is connected to a common point 38 and the remaining terminals to the three mains or leads 39, 40, and 41. Across each pair of these leads is connected a condenser and an inductance in series. Thus across the leads 39 and 40 are connected the condenser 42 and the inductance-coil 43. Across the leads 40 and 41 are similarly connected the condenser 44 and the inductance-coil 45, while across the remaining pair of leads 39 and 41 are connected the condenser 46 and the inductance-coil 47. A circuit containing the primary of a transformer and an inductance-coil is connected across one of the reactances of each pair, and for the sake of symmetry, as in Fig. 1, the connections are made across the terminals of the three condensers 42, 44, and 46. The three primaries are indicated, respectively, at 48, 49, and 50 and the corresponding inductance-coils at 51, 52, and 53. The corresponding secondaries 54, 55, and 56 are connected, respectively, in series with the three constant-potential secondaries 37, 33, and 35, which latter secondaries are joined together at the common point 57, constituting the usual three-phase star connection. The two sets of secondaries thus mentioned supply current to the rectifying apparatus, (indicated generally at 58,) by which rectified current is delivered to a consumption-circuit containing any suitable translating devices, such as arc or other lamps 59. The transformers supplied from the constant-current-transforming apparatus operate through their connection with the latter to maintain a constant current in the circuit connected to the rectifier, while the constant-potential-transformer secondaries in series in this circuit have the effect of increasing the capacity of the system without interfering with the regulating action of the system or impairing its power factor, which under ordinary conditions should approximate one hundred per cent. As in Fig. 1, the rectifying apparatus may be omitted and the constant current utilized as produced.

What I claim as new, and desire to secure by Letters Patent of the United States, is—

1. The combination of constant-potential multiphase mains, constant-current mains, and means possessing capacity but insensitive to harmonics for transferring energy between said mains.

2. The combination of multiphase alternating-current mains, reactances in series across each pair of said mains, a circuit shunted about one reactance of each set of reactances, and a device possessing inductance in each of said circuits.

3. The combination of a source of multiphase alternating current, means for deriving from said source a plurality of relatively phase-displaced constant alternating currents, said means including an inductance in series with each circuit carrying said constant current.

4. The combination of constant-potential mains, constant-current mains, and means possessing capacity but insensitive to harmonics for transferring energy inductively between said sets of mains.

5. The combination of a source of multiphase alternating currents and means for deriving therefrom a plurality of phase-displaced constant currents, said means including a device for suppressing harmonics in each of the circuits carrying said constant currents.

In witness whereof I have hereunto set my hand this 17th day of May, 1902.

CHARLES P. STEINMETZ.

Witnesses:
BENJAMIN B. HULL,
HELEN ORFORD.